(12) United States Patent
Nakamura et al.

(10) Patent No.: US 8,803,679 B2
(45) Date of Patent: Aug. 12, 2014

(54) ENGINE ROTATIONAL SPEED DISPLAY DEVICE

(75) Inventors: Masanori Nakamura, Wako (JP); Kenichi Machida, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 233 days.

(21) Appl. No.: 13/529,000

(22) Filed: Jun. 21, 2012

(65) Prior Publication Data

US 2013/0002418 A1    Jan. 3, 2013

(30) Foreign Application Priority Data

Jun. 28, 2011    (JP) .................. 2011-143148

(51) Int. Cl.
*B60Q 1/00*    (2006.01)
(52) U.S. Cl.
USPC ......... 340/441; 123/350; 340/815.4; 180/170
(58) Field of Classification Search
CPC ... B60L 1/00; B60L 2250/00; B60L 2250/16; B60Y 2200/12; G60R 1/00; G60R 16/0232; G08G 1/0962; F02D 31/006; B60Q 1/00; G07C 5/004
USPC ............... 340/441, 438, 815.4; 123/350, 351, 123/352; 180/170
See application file for complete search history.

(56) References Cited

U.S. PATENT DOCUMENTS

| | | | |
|---|---|---|---|
| 7,602,278 B2* | 10/2009 | Prost-Fin et al. ............ | 340/438 |
| 7,710,252 B2* | 5/2010 | Kaya ............................ | 340/459 |
| 7,866,859 B2* | 1/2011 | Suzuki et al. ................ | 362/489 |
| 8,365,709 B2* | 2/2013 | Usukura et al. .............. | 123/631 |
| 8,428,842 B2* | 4/2013 | Yasui et al. .................... | 701/93 |
| 2011/0037583 A1* | 2/2011 | Fitzgerald et al. ........... | 340/441 |
| 2012/0062375 A1* | 3/2012 | Takeuchi et al. ............. | 340/441 |
| 2013/0257609 A1* | 10/2013 | Otsuji et al. ................. | 340/441 |
| 2014/0002256 A1* | 1/2014 | Hoshiba ....................... | 340/441 |

FOREIGN PATENT DOCUMENTS

JP    01-154195 A    6/1989

* cited by examiner

*Primary Examiner* — George Bugg
*Assistant Examiner* — Edny Labbees
(74) *Attorney, Agent, or Firm* — Squire Patton Boggs (US) LLP (57) ABSTRACT

An engine rotational speed display device includes a rotational speed sensor and a pulse rotor. An engine rotational speed calculating unit is configured to calculate an engine rotational speed by a moving average of a detected value of a crankshaft rotational speed pulse. A display unit is configured to display the engine rotational speed on a meter by electrical processing. When the crankshaft rotational speed pulse is not detected in a detection time equal to or more than a predetermined value, the engine rotational speed calculating unit determines that the engine rotational speed is "0," and the engine rotational speed of "0" is displayed on the meter.

6 Claims, 7 Drawing Sheets

ENGINE ROTATIONAL SPEED DISPLAY DEVICE

BACKGROUND

1. Field

The present invention relates to a device for displaying an engine rotational speed on a tachometer included in a motorcycle, and particularly to an engine rotational speed display device capable of making display without causing a sense of incongruity even when the engine rotational speed varies sharply in a case of electrically displaying the engine rotational speed.

2. Description of the Related Art

Conventionally, when an engine rotational speed display device electrically displays the rotational speed of an engine, crankshaft rotational speed pulses generated by the rotation of a crank pulse rotor provided to the crankshaft of the engine are detected by a rotational speed sensor. The engine rotational speed is calculated on the basis of a moving average of detected values of the crankshaft rotational speed pulses.

Such an engine rotational speed display device causes a phenomenon in which variation in accuracy of the rotational speed sensor when the engine rotational speed is in a low rotational speed range affects the display of the rotational speed, and impairs the ease of visually checking the display of the rotational speed. Accordingly, in order to prevent occurrence of such a phenomenon, the length of a determination time for calculating a moving average is changed according to whether the engine rotational speed is high or low. When the engine rotational speed is low, the engine rotational speed is displayed with the determination time lengthened to standardize the variation. When the engine rotational speed is high, response in a case of displaying the engine rotational speed is improved by shortening the determination time. An example of such related art can be found in Japanese Patent Laid-Open No. Hei 01-154195.

Although the above-described engine rotational speed display device has an effect in determining a steady-state engine rotational speed, there occurs a delay in the display of the engine rotational speed immediately after the rotational speed varies sharply, for example immediately after the engine is stopped, and in the display of the engine rotational speed when the engine is stopped due to an inappropriate starting operation of an MT vehicle, for example. The display of the engine rotational speed is not immediately changed to "0" even though the engine is stopped, thus causing a sense of incongruity to the driver. Therefore sufficient provisions have not been made for sharp variations in the engine rotational speed.

SUMMARY

The present invention has been proposed in view of the above situation. It is an object of the present invention to provide an engine rotational speed display device capable of displaying an engine rotational speed without causing a sense of incongruity by following changes in the engine rotational speed at times of sharp variations.

In order to achieve the above object, according to one embodiment, there is provided an engine rotational speed display device including a rotational speed sensor configured to detect a crankshaft rotational speed pulse according to rotation of a crank pulse rotor provided to a crankshaft of an engine. An engine rotational speed calculating unit is configured to calculate an engine rotational speed by a moving average of a detected value of the crankshaft rotational speed pulse. A display is configured to display the engine rotational speed on a meter by electrical processing. In this embodiment, the engine rotational speed display device is such that when the crankshaft rotational speed pulse is not detected in a detection time equal to or more than a predetermined value, the engine rotational speed calculating unit is configured to determine that the engine rotational speed is "0" without calculating the engine rotational speed by the moving average, and the engine rotational speed of "0" is displayed on the meter.

In another embodiment, the engine rotational speed display device is configured such that the engine rotational speed calculating unit includes a predetermined value changing unit configured to change the predetermined value when a tooth lacking region is present in the crank pulse rotor.

According to an embodiment, it is possible to determine that the engine is stopped when the crankshaft rotational speed pulse is not detected in the detection time equal to or more than the predetermined value and to set the display of the engine rotational speed to "0" immediately without calculating the engine rotational speed by the moving average. Thus, occurrence of a sense of incongruity due to a display response delay on the meter (rotation indicator) can be prevented.

According to another embodiment, even when the tooth lacking region is present in the crank pulse rotor, it is possible to detect a time of an engine stop in the tooth lacking region and set the display of the engine rotational speed to "0" by increasing the predetermined value used to determine that the engine is stopped.

DETAILED DESCRIPTION

Figure 1:
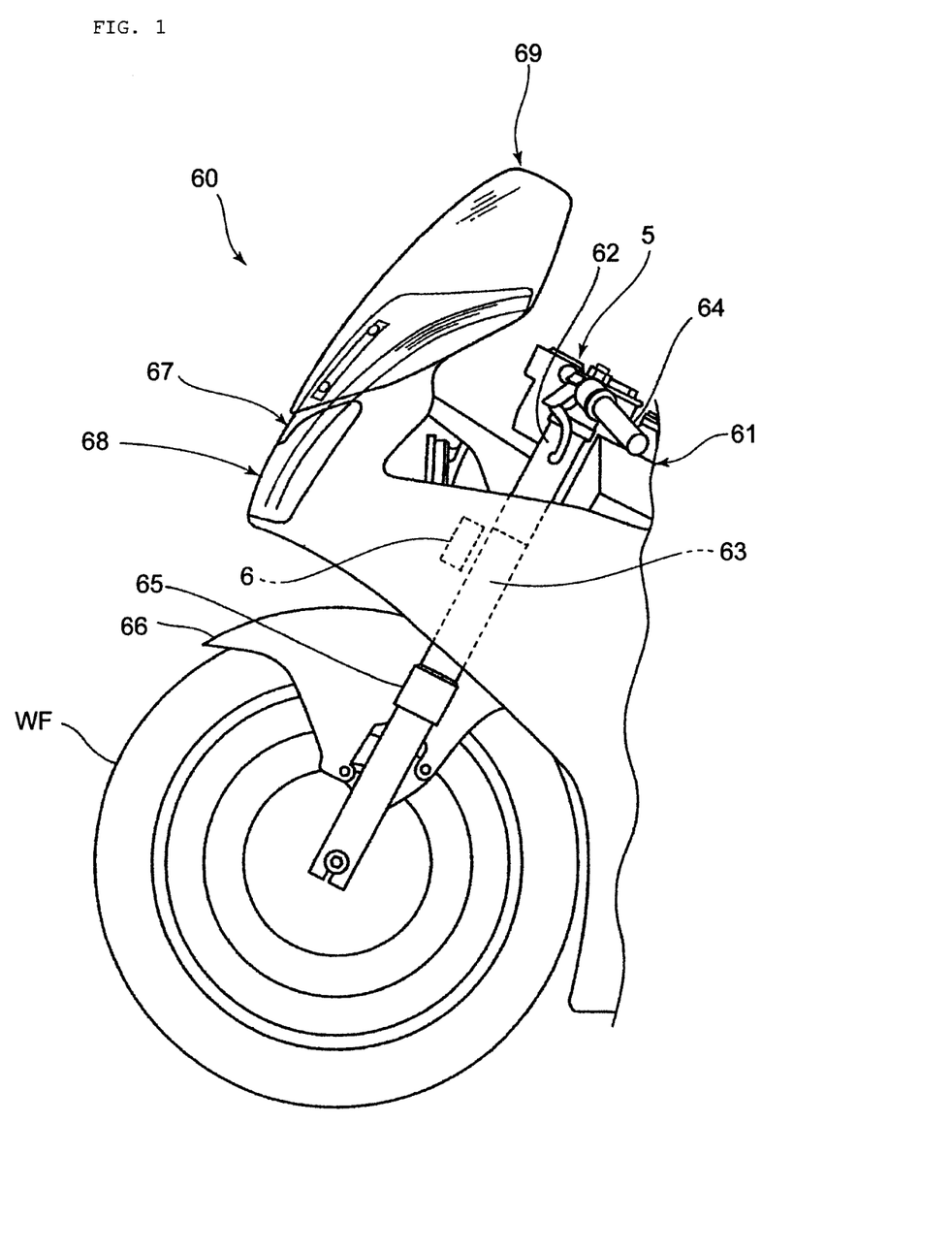
FIG. 1 is a side explanatory view of a front half of a motorcycle including an engine rotational speed display device according to an embodiment of the present invention.

An example of an embodiment of an engine rotational speed display device according to the present invention will be described with reference to the drawings. FIG. 1 is a side view of a front part of a motorcycle having an engine rotational speed display device according to an embodiment of the present invention.

A vehicle, such as motorcycle 60, has a vehicle body frame 61. A head tube 63 for rotatably supporting a steering stem 62 is coupled to a front end part of the vehicle body frame 61. A pair of left and right steering handlebars 64 is attached to an upper part of the steering stem 62. A meter part 5 having a speedometer as a speed indicator, a tachometer as an engine rotation indicator, a fuel gauge, an odometer, various indicators, and the like arranged therein is disposed at a central position of the steering handlebars 64. A pair of left and right front fork members 65 (only one of the front fork members is shown in FIG. 1) for rotatably supporting a front wheel WF is attached to a lower part of the steering stem 62. A front fender 66, covering the front wheel WF, is attached to the front fork members 65.

The vehicle body frame 61 supports an engine (not shown) at a position to the rear of the front wheel WF. A rear wheel as a driving wheel is supported to the rear of the engine via a swing arm. In addition, a rider seat supported by the vehicle body frame 61 is disposed at a position to the rear of the steering handlebars 64. A driver in the rider seat visually checks various kinds of information from the meter part 5 and performs driving operations such as handlebar steering.

An FI-ECU 6 for controlling an ignition device, a fuel injection device, and the like of the engine is disposed in front of the head tube 63. A headlight 68 and a windscreen 69 are attached to a front cowl 67 formed so as to cover the front of a vehicle body including the FI-ECU 6.

Figure 2:
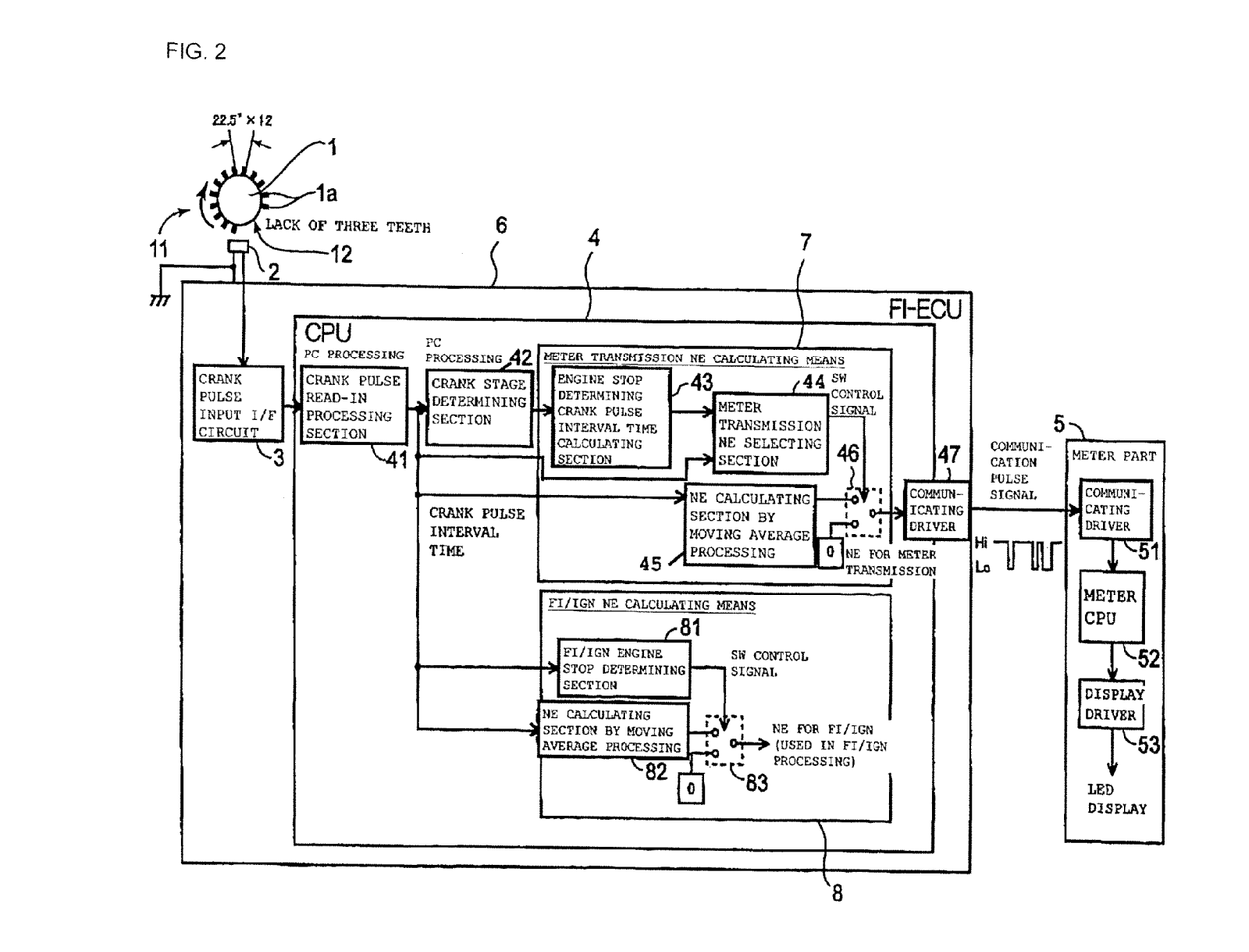
FIG. 2 is a block diagram showing a general configuration of an engine rotational speed display device according to an embodiment of the present invention.

FIG. 2 is a block diagram showing a general configuration of the engine rotational speed display device according to one embodiment of the present invention.

In FIG. 2, the following legends apply:
a: PC PROCESSING
b: SW CONTROL SIGNAL
c: NE FOR METER TRANSMISSION
d: NE FOR FI/IGN (USED IN FI/IGN PROCESSING)
e: COMMUNICATION PULSE SIGNAL
3: CRANK PULSE INPUT I/F CIRCUIT
5: METER PART
7: METER TRANSMISSION NE CALCULATING MEANS
8: FI/IGN NE CALCULATING MEANS
41: CRANK PULSE READ-IN PROCESSING SECTION
42: CRANK STAGE DETERMINING SECTION
43: ENGINE STOP DETERMINING CRANK PULSE INTERVAL TIME CALCULATING SECTION
44: METER TRANSMISSION NE SELECTING SECTION
45: NE CALCULATING SECTION BY MOVING AVERAGE PROCESSING
47: COMMUNICATING DRIVER
51: COMMUNICATING DRIVER
81: FI/IGN ENGINE STOP DETERMINING SECTION
82: NE CALCULATING SECTION BY MOVING AVERAGE PROCESSING The engine rotational speed display device can include a crank pulse sensor (rotational speed sensor) 2 disposed in the vicinity of a crank pulse rotor 1 provided to a crankshaft of the engine. A crank pulse input I/F circuit 3 is provided, and an engine control section (CPU) 4 is configured to perform various kinds of control on the engine. A meter part, or display means 5 is configured to display an engine rotational speed calculated by the engine control section 4 by electrical processing. The crank pulse input I/F circuit 3 and the engine control section 4 are provided within the FI-ECU 6 for controlling the ignition timing, fuel injection, and the like of the engine.

In this example, the crank pulse rotor 1 has a plurality of projection parts 1a, in this example there are 13 projection parts formed at intervals of 22.5 degrees (16 equal parts) on a part of the periphery of a disk. Three projection parts 1a are omitted so that a tooth formation region 11 and a tooth lacking region 12 are provided.

When the crank pulse rotor 1 rotates, the rotational speed sensor 2 senses the passage of the projection parts 1a on the periphery, and outputs a crankshaft rotational speed pulse corresponding to a time of the passage in the tooth formation region 11.

The crank pulse input I/F circuit 3 is an interface for outputting a signal (crankshaft rotational speed pulse) from the crank pulse sensor 2 to the engine control section 4.

The engine control section (CPU) 4 calculates an engine rotational speed from the crankshaft rotational speed pulse obtained by the crank pulse sensor 2 and outputs a communication pulse signal to the display means 5. The engine control section (CPU) 4 includes a crank pulse read-in processing section 41, a crank stage determining section 42, an engine stop determining crank pulse interval time calculating section 43, a meter transmission rotational speed selecting section (meter transmission Ne selecting section) 44, a rotational speed calculating section (Ne calculating section by moving average processing) 45, a selector switch 46, and a communicating driver 47.

The crank pulse read-in processing section 41 reads in the crankshaft rotational speed pulse obtained by the crank pulse sensor 2 and outputs a crank pulse as a binary signal that is "1" only during the passage of a projection part 1a to each of the crank stage determining section 42, the meter transmission rotational speed selecting section 44, and the rotational speed calculating section 45.

The crank stage determining section 42 determines which crank stage of the tooth formation region 11 and the tooth lacking region 12 the rotation of the crank pulse rotor 1 is in. The CPU performing engine control determines a crank reference position in a state of the engine rotating to a certain degree and always grasps the position (crank angle (CA) in 720°) of the crankshaft in each of strokes (an intake stroke, a compression stroke, an explosion stroke, and an exhaust stroke) of the engine. Thus, on the basis of the information, the crank stage determining section 42 can recognize to which of the projection parts 1a of the crank pulse rotor 1 a crank pulse corresponds and can determine whether a present position is in the tooth formation region 11 or the tooth lacking region 12.

The engine stop determining crank pulse interval time calculating section 43 calculates a crank pulse interval time for making engine stop determination from crank pulses, and switches between a first predetermined value (time) when a part as an object for the engine stop determination is in the tooth formation region 11 of the crank pulse rotor 1 and a second predetermined value (time) when the part is in the tooth lacking region 12 of the crank pulse rotor 1. A threshold value for the crank pulse interval time at which it is determined that the engine is stopped is set at 37.5 ms, which is a crank pulse interval time corresponding to 100 rotations/minute that makes it difficult to return to rotation, for example, in the case of the first predetermined value (time). In the case of the second predetermined value (time), the threshold value is set at 150 ms, which is four times the first predetermined value (37.5 ms) in consideration of the presence of the tooth lacking region 12.

The engine stop determining crank pulse interval time calculating section 43, the meter transmission rotational speed selecting section 44, the rotational speed calculating section 45, and the selector switch 46 form a meter transmission engine rotational speed calculating means (meter transmission Ne calculating means) 7 for transmitting to the display means 5.

The meter transmission rotational speed selecting section 44 switches (performs on-off control on) the selector switch 46 by outputting an SW control signal according to whether the crank pulse interval time between the input crank pulses is longer than the crank pulse interval time (the first predetermined value or the second predetermined value) for the engine stop determination.

Specifically, the engine rotational speed calculated by the rotational speed calculating section 45 is output to the display means 5 via the communicating driver 47 at a time of normal operation, and an engine rotational speed of "0" is output to the display means 5 via the communicating driver 47 at a time of determining that the engine is stopped.

The rotational speed calculating section 45 calculates an engine rotational speed by 360° CA (crank angle) moving average processing of the input crank pulses. The 360° CA moving average processing for example adds together elapsed times (crank pulse interval times) from falling edges of the crank pulses to next falling edges of the crank pulses which elapsed times correspond to one rotation (360°) of the crank pulse rotor, obtains a pulse interval moving average value (time) by dividing the elapsed times by a predetermined number (13), and thus calculates an average engine rotational speed (ME36ASL) according to the immediately preceding 360° A. The calculated engine rotational speed is output to the communicating driver 47 via the selector switch 46, when the rotational speed calculating section 45 is selected. A communication pulse signal for displaying the engine rotational speed is output from the communicating driver 47 to the meter part 5.

In addition, when the 360° CA moving average processing is performed, an engine rotational speed calculated from a crank pulse interval time corresponding to one crank pulse is stored as an instantaneous rotational speed (MECA00).

An example of calculating an engine rotational speed so as to correspond to a crank pulse will be described with reference to FIG. 3 and FIG. 4.

Figure 3:
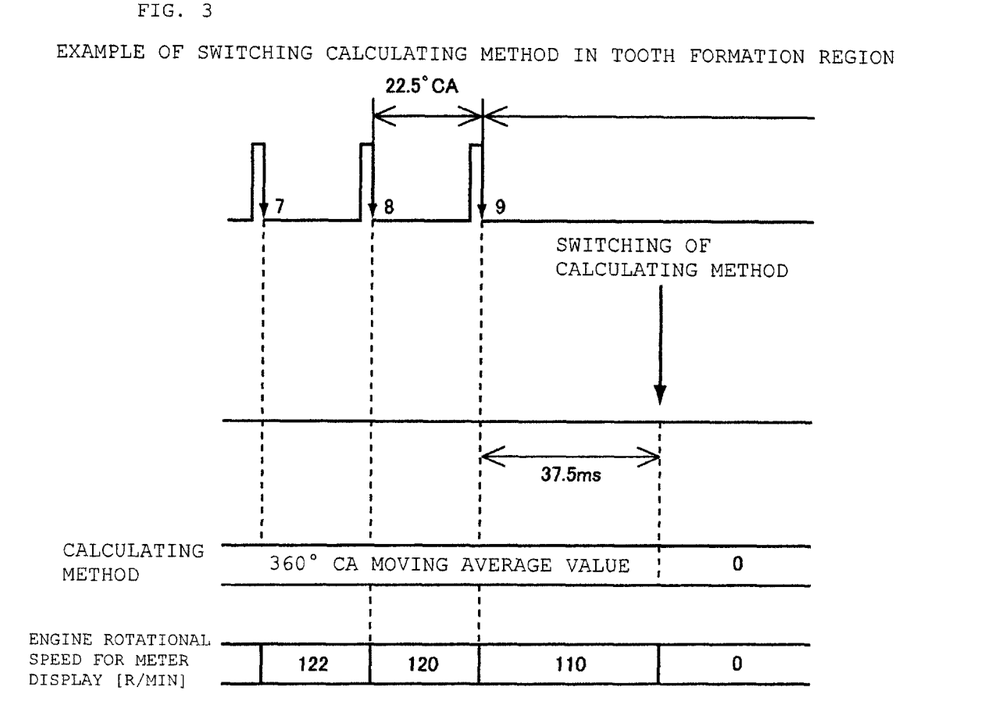
FIG. 3 is a timing chart showing an engine rotational speed for meter display in relation to crank pulses in a tooth formation region of a crank pulse rotor.

In making engine stop determination, in the case of the tooth formation region 11, as shown in FIG. 3, a calculating method is switched from "Engine Rotational Speed=Crank Pulse 360° CA Moving Average Processing" to "Engine Rotational Speed=0" and an engine rotational speed of "0" is selected, at a point in time of passage of the first predetermined value (37.5 ms) from a falling edge of a last crank pulse. Numbers "7," "8" and "9" shown at the falling edges of crank pulses in FIG. 3 denote the crank pulses corresponding to the seventh to ninth projection parts 1a of the crank pulse rotor 1. If the engine is not stopped, a tenth crank pulse is output after the ninth crank pulse.

Figure 4:
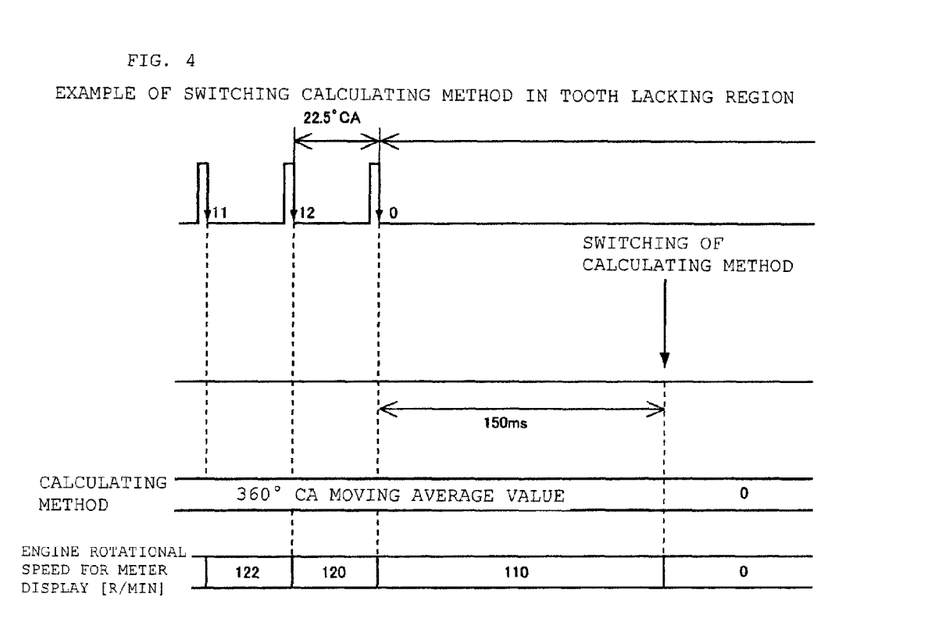
FIG. 4 is a timing chart showing an engine rotational speed for meter display in relation to crank pulses in a tooth lacking region of the crank pulse rotor.

In the case of the tooth lacking region 12, as shown in FIG. 4, the calculating method is switched from "Engine Rotational Speed=Crank Pulse 360° CA Moving Average Processing" to "Engine Rotational Speed=0" and an engine rotational speed of "0" is selected, at a point in time of passage of the second predetermined value (150 ms) from a falling edge of a last crank pulse. Numbers "11," "12" and "0" shown at the falling edges of crank pulses in FIG. 4 denote the crank pulses corresponding to the eleventh to thirteenth projection parts 1a of the crank pulse rotor 1, and indicate that the tooth lacking region comes after the thirteenth crank pulse.

In FIG. 3 and FIG. 4, the engine rotational speed for meter display is shown as "122," "120" and "110." The engine rotational speed "110" shown from the falling edge of the last crank pulse to the time of switching the calculating method is obtained according to a 360° moving average value immediately preceding the last crank pulse (average of elapsed times from the falling edges of immediately preceding 13 crank pulses to the next falling edges). The engine rotational speeds "122" and "120" are also obtained according to immediately preceding 360° moving average values.

Figure 5:
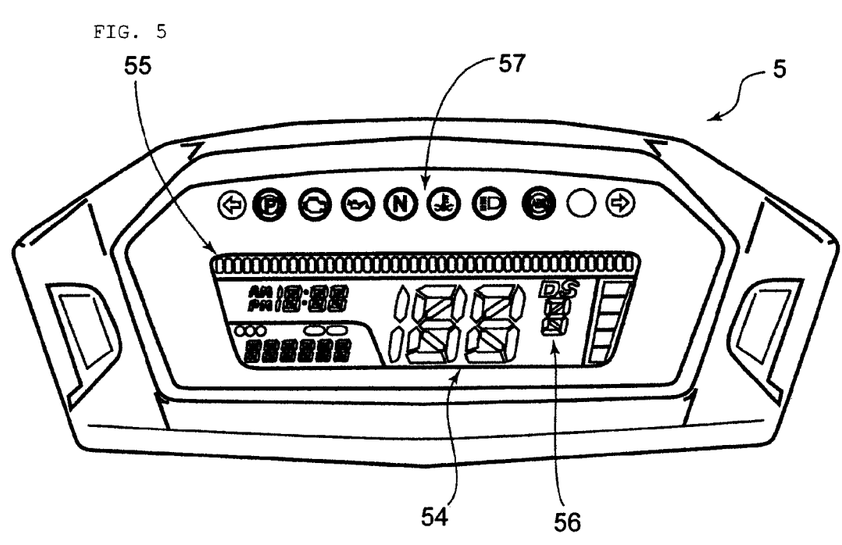
FIG. 5 is a plan explanatory view of a meter part included in the motorcycle.

The meter part or display means 5 has various LED display devices such as meters formed on a surface as shown in FIG. 5. The meter part 5 includes, within the meter part 5, a communicating driver 51 for receiving the communication pulse signal from the communicating driver 47 of the engine control section 4, and a meter CPU 52 for controlling the display of the various display devices. A display driver 53 is configured to output signals to the various display devices.

The LED display devices can include a speedometer or speed indicator 54 for digitally displaying a vehicle speed, and a tachometer 55 for making bar display of the engine rotational speed by changing the area of an illuminating region in a horizontal direction. A gear position indicator 56 is configured to display a gear position, and indicators 57 can include various warning lights for a water temperature, an oil temperature, and the like.

The engine control section 4 also can include an FI/IGN engine rotational speed calculating unit, shown as FI/IGN Ne calculating means 8 for controlling the engine, separately from the meter transmission engine rotational speed calculating unit or means 7. The FI/IGN engine rotational speed calculating means 8 includes an FI/IGN engine stop determining section 81, a rotational speed calculating section (Ne calculating section by moving average processing) 82, and a selector switch 83. The FI/IGN engine stop determining section 81 and the rotational speed calculating section 82 are supplied with crank pulses from the crank pulse read-in processing section 41.

The FI/IGN engine stop determining section 81 determines that the engine is stopped when a crank pulse interval time between input crank pulses is equal to or more than 600 ms. While determining that the engine is stopped, the FI/IGN engine stop determining section 81 switches the selector switch 83 by outputting an SW control signal so as to cancel the engine stop determination when a crank pulse occurs in 150 ms or less. Thus, the engine rotational speed calculated by the rotational speed calculating section 82 is output at a time of normal operation, and an engine rotational speed of "0" is output at a time of determining that the engine is stopped. The engine is controlled on the basis of the values of the rotational speed.

Specifically, as with the rotational speed calculating section 45, the rotational speed calculating section 82 calculates the engine rotational speed by 360° CA (crank angle) moving average processing of the input crank pulses. The calculated engine rotational speed is used as engine rotational speed for FI/IGN processing for engine control such as control of ignition timing and fuel injection via the selector switch 83 (when the rotational speed calculating section 82 is selected).

When the engine rotational speed for FI/IGN is obtained by the FI/IGN engine rotational speed calculating means 8 as a system separate from the meter transmission engine rotational speed calculating means 7, the value of the engine rotational speed suitable for engine control such as control of ignition timing and fuel injection can be obtained.

Figure 6:
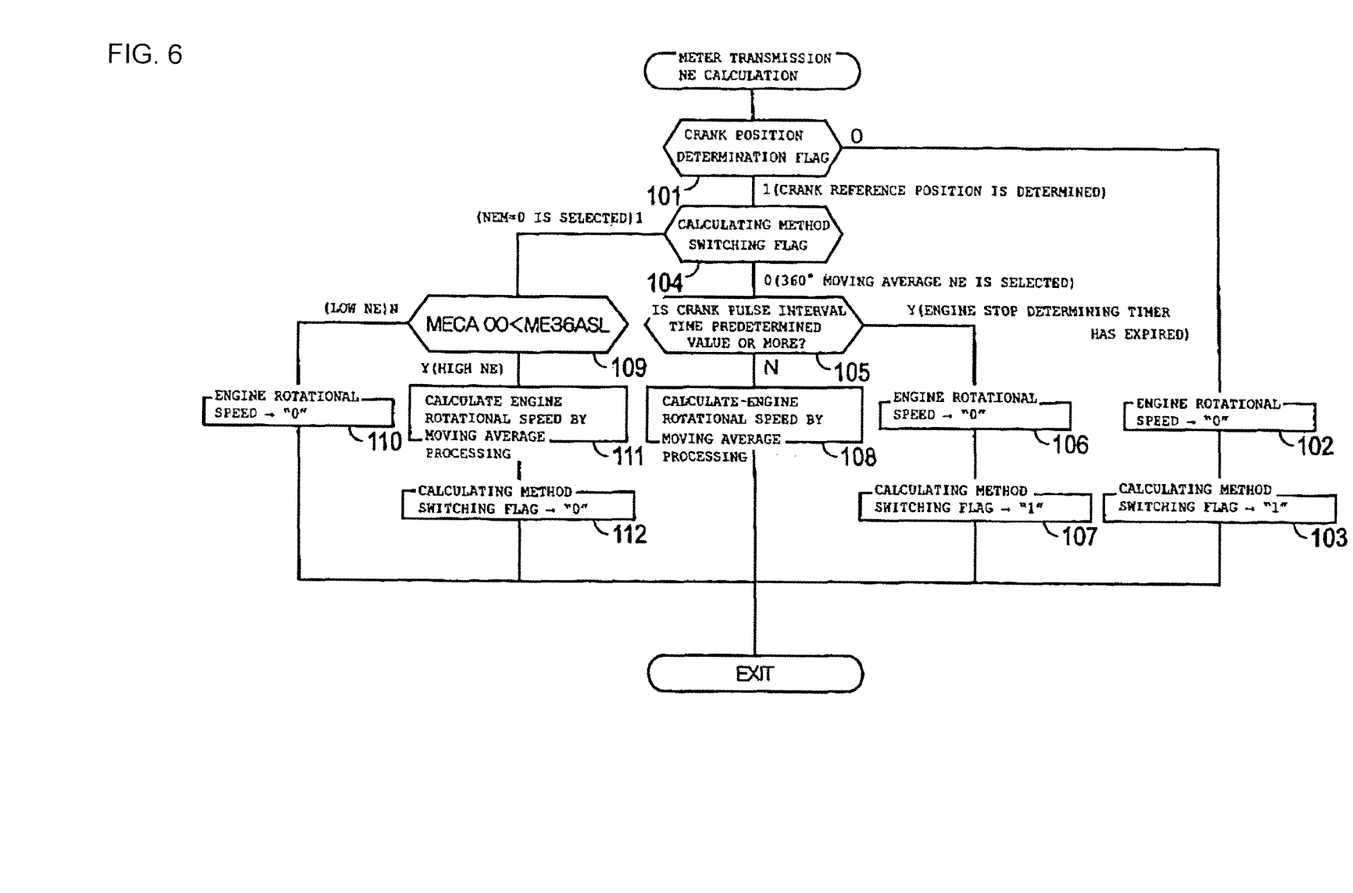
FIG. 6 is a flowchart of a procedure for calculating a rotational speed in the engine rotational speed display device.

Next, a procedure for calculating the engine rotational speed by the meter transmission engine rotational speed calculating means 7 of the above-described engine rotational speed display device will be described with reference to a flowchart of FIG. 6.

In an initial state, the output rotational speed is set at "0," and a calculating method switching flag is set at "1." In addition, when the crank reference position is determined in a state of the engine rotating to a certain degree, a crank position determination flag is set at "1." When the crank reference position is not determined, the crank position determination flag is set at "0."

First, whether the crank position is determined is determined according to the crank position determination flag at step 101. When the crank position is not determined with the crank position determination flag set at "0," the output engine rotational speed is maintained at "0" at step 102, and the calculating method switching flag is maintained at "1" at step 103.

When the crank position is determined with the crank position determination flag set at "1," whether the calculating method switching flag is "0" or "1" is determined at step 104.

When the calculating method switching flag is "0" in step 104, rotational speed calculation by moving average processing is selected. Then, in the rotational speed calculation by moving average processing, an elapsed time from a falling edge of a last crank pulse (crank pulse interval time) is detected, and whether a time equal to or more than a predetermined value has passed is determined at step 105. It is determined in this determination that the predetermined value has passed when an engine stop determining timer in which a time corresponding to the predetermined value is set expires. According to the crank position, the predetermined value is switched between the first predetermined value (such as 37.5 ms) in the case of the tooth formation region 11 and the second predetermined value (such as 150 ms) in the case of the tooth lacking region 12.

When the elapsed time is equal to or more than the predetermined value, it is determined that the engine is stopped, so that the output engine rotational speed is set to "0" at step 106, and the calculating method switching flag is set to "1" at step 107.

When the elapsed time is less than the predetermined value, the rotational speed calculation by moving average processing is performed at step 108.

When the calculating method switching flag is set at "1" in step 104, the output engine rotational speed of "0" is selected. Then, whether an average engine rotational speed (ME36ASL) according to an immediately preceding 360° CA is higher than an instantaneous rotational speed (MECA00) is determined at step 109. When Instantaneous Rotational Speed (MECA00)<Average Engine Rotational Speed (ME36ASL) does not hold, the output engine rotational speed of "0" is maintained at step 110.

When Instantaneous Rotational Speed (MECA00)<Average Engine Rotational Speed (ME36ASL) holds, rotational speed calculation by moving average processing is performed at step 111, and the calculating method switching flag is set to "0" at step 112.

The above process is repeated to calculate the engine rotational speed for meter transmission. The meter CPU 52 accordingly changes the area of the illuminating region in the bar display of the tachometer 55 in the meter part 5.

The tachometer 55 in the meter part 5 indicates the engine rotational speed of "0" by eliminating the illuminating region in the bar display.

In the above-described example, in calculating the rotational speed by moving average processing in the rotational speed calculating section 45 and the rotational speed calculating section 82, the engine rotational speed is calculated by crank pulse 360° CA moving average processing. However, the engine rotational speed may be calculated by 720° (an intake stroke, a compression stroke, an explosion stroke, and an exhaust stroke of the engine) CA moving average processing, 720° corresponding to two rotations of the crankshaft. In this case, the engine rotational speed calculated by the crank pulse 360° CA moving average processing is used when high response is desired to be achieved in the meter display, and the engine rotational speed calculated by the crank pulse 720° CA moving average processing is used when stability is desired to be maintained in the meter display.

Figure 7:
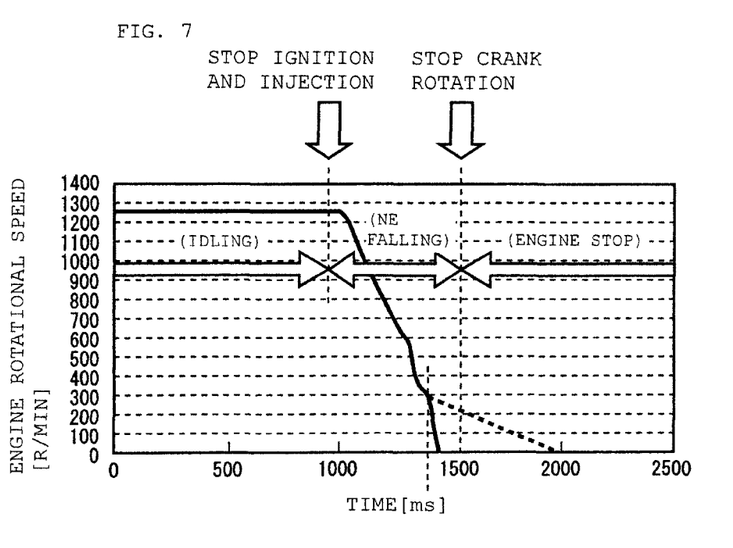
FIG. 7 is a graph showing relation between the engine rotational speed displayed by the engine rotational speed display device and time.

Next, FIG. 7 shows an example of variation in numerical value of the engine rotational speed when the above-described engine rotational speed display device (calculation by 360° CA moving average processing) is used to display the engine rotational speed. A solid line in FIG. 7 shows changes in the engine rotational speed on the meter of the engine rotational speed display device having the above-described configuration when the engine is stopped by an engine stop switch or the like from an idling rotational speed such as 1250 rotations.

According to the changes in the engine rotational speed indicated by the solid line, when the rotational speed falls from the idling rotational speed in a stage of ignition and injection being stopped and then the crank rotation is stopped (engine is stopped), an engine rotational speed of "0" is displayed on the meter immediately before the crank rotation is actually stopped.

On the other hand, when the engine rotational speed is calculated by using only the conventional moving average processing (calculation according to 360° CA), the same locus as the solid line is formed partway until a point, but an engine rotational speed whose display is significantly delayed with respect to the actual rotation as indicated by a dotted line is displayed immediately before the crank rotation is stopped.

Thus, when only the moving average processing is used, the meter displays a few hundred rotations even after the crankshaft is actually stopped, thus causing a sense of incongruity. On the other hand, the above-described engine rotational speed display device can surely display the engine rotational speed of "0" when the crankshaft is stopped.

According to the configuration of the above-described engine rotational speed display device, the display of the engine rotational speed can be immediately set to "0" when the engine is stopped. It is therefore possible to make display that prevents a sense of incongruity from being caused due to a display response delay on the tachometer 55 of the meter part 5.

In addition, even when the tooth lacking region 12 is present in the crank pulse rotor 1, it is possible to detect a time of an engine stop in the tooth lacking region 12 and set the display of the engine rotational speed to "0" by increasing a predetermined value serving as a threshold value for a crank pulse interval time which threshold value is used to determine whether the engine is stopped.

The above description has been made of an example in which the engine rotational speed display device calculates the engine rotational speed for meter transmission, and displays the engine rotational speed on the tachometer 55 of the meter part 5. Other information on a speed, a gear position, a water temperature, an oil temperature, and the like is also serially communicated from the engine control section 4 to the meter part 5, and the meter CPU 52 displays the information on the speedometer 54, the gear position indicator 56, and the various indicators 57, respectively.

When the plurality of kinds of information are transmitted and received, the data is sequentially sent at certain intervals and in a certain sequence. In addition, as a measure against noise, identical data is transmitted a plurality of times, and a receiving side confirms that the data matches and determines whether to use the data.

For example, when three kinds of information "1," "2" and "3" are transmitted as data, the data transmission is made in such an order as 1→1→2→2→3→3→1→1→2→2→3→3→ . . . .

However, as the number of kinds of information is increased, such a data communicating system may cause a phenomenon in which the frequency of updating each piece of data is decreased, and there may be a possibility of a sense of incongruity being caused to a driver due to an information response delay.

As a measure against such a case, data whose updating frequency has higher priority such as engine rotational speed information is transmitted at shorter time intervals, and information for the various indicators and gear position information are transmitted at longer time intervals.

For example, when three kinds of information "1," "2" and "3" are transmitted as data, the information "1" updated with a high frequency is transmitted at short time intervals in such an order as 1→1→2→2→1→1→→3→3→1→1→2→2→ 1→1→3→3 . . . . In this example, the information "2" and the information "3" are updated at the same time intervals.

According to this communicating system, data transmission and reception can be performed with appropriate updating frequencies according to kinds of data. Thus, meter display not causing a sense of incongruity can be made of both of the engine rotational speed information updated with a high frequency and the gear position information and the information for the various indicators which information is updated with a low frequency.

In addition, a real-time property can be further improved by sequentially transmitting updated data at certain intervals or irregular intervals in descending order of priority.

DESCRIPTION OF REFERENCE NUMERALS

1 . . . Crank pulse rotor, 2 . . . Crank pulse sensor (rotational speed sensor), 3 . . . Crank pulse input I/F circuit, 4 . . . Engine control section (CPU), 5 . . . Meter part (display means), 6 . . . FI-ECU, 7 . . . Meter transmission engine rotational speed calculating means, 8 . . . FI/IGN engine rotational speed calculating means, 11 . . . Tooth formation region, 12 . . . Tooth lacking region, 42 . . . Crank stage determining section, 43 . . . Engine stop determining crank pulse interval time calculating section (predetermined value changing means), 44 . . . Meter transmission rotational speed selecting section, 45 . . . Rotational speed calculating section, 46 . . . Selector switch, and 60 . . . Motorcycle.

The invention claimed is:

1. An engine rotational speed display device, comprising:
a rotational speed sensor configured to detect a crankshaft rotational speed pulse according to rotation of a crank pulse rotor provided to a crankshaft of an engine;
an engine rotational speed calculating unit configured to calculate an engine rotational speed by a moving average of a detected value of the crankshaft rotational speed pulse; and
a display unit configured to display the engine rotational speed on a meter by electrical processing,
wherein, when the crankshaft rotational speed pulse is not detected in a detection time equal to or more than a predetermined value, the engine rotational speed calculating unit determines that the engine rotational speed is "0" without calculating the engine rotational speed by the moving average, and the engine rotational speed of "0" is displayed on the meter.

2. The engine rotational speed display device according to claim 1,
wherein the engine rotational speed calculating unit includes a predetermined value changing unit configured to change the predetermined value when a tooth lacking region is present in the crank pulse rotor.

3. An engine rotational speed display device, comprising:
rotational speed sensor means for detecting a crankshaft rotational speed pulse according to rotation of a crank pulse rotor provided to a crankshaft of an engine;
engine rotational speed calculating means for calculating an engine rotational speed by a moving average of a detected value of the crankshaft rotational speed pulse; and
display means for displaying the engine rotational speed on a meter by electrical processing,
wherein, when the rotational speed pulse is not detected in a detection time equal to or more than a predetermined value, the engine rotational speed calculating means determines that the engine rotational speed is "0" without calculating the engine rotational speed by the moving average, and the engine rotational speed of "0" is displayed on the meter.

4. The engine rotational speed display device according to claim 3, wherein the engine rotational speed calculating means includes a predetermined value changing means for changing the predetermined value when a tooth lacking region is present in the crank pulse rotor.

5. A method for displaying engine rotational speed, said method comprising:
detecting a crankshaft rotational speed pulse according to rotation of a crank pulse rotor provided to a crankshaft of an engine;
calculating an engine rotational speed by a moving average of a detected value of the crankshaft rotational speed pulse; and
displaying the engine rotational speed on a meter;
wherein, when the crank shaft rotational speed pulse is not detected in a detection time equal to or more than a predetermined value, the method includes determining that the engine rotational speed is "0" without calculating the engine rotational speed by the moving average, and wherein the engine rotational speed of "0" is displayed on the meter.

6. The method according to claim 5, said method further comprising changing the predetermined value when a tooth lacking region is present in the crank pulse rotor.

* * * * *